United States Patent
Cheng et al.

(10) Patent No.: US 6,654,762 B2
(45) Date of Patent: Nov. 25, 2003

(54) GENERATING SMALL FOOTPRINT APPLICATIONS FOR MOBILE DEVICES

(75) Inventors: Josephine Miu Cheng, San Jose, CA (US); Jyh-Herng Chow, San Jose, CA (US); Thanh Tan Pham, San Jose, CA (US); HongHai Shen, San Jose, CA (US); I-Shin Andy Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 09/374,957

(22) Filed: Aug. 16, 1999

(65) Prior Publication Data

US 2002/0143468 A1 Oct. 3, 2002

(51) Int. Cl.[7] .............................................. G06F 17/30
(52) U.S. Cl. ...................... 707/102; 707/103 R; 707/10; 345/336
(58) Field of Search ...................... 717/10–11; 707/3–6; 709/106; 345/336, 329, 349, 124, 351; 370/401; 713/200

(56) References Cited

U.S. PATENT DOCUMENTS

| | | | | |
|---|---|---|---|---|
| 4,024,504 A | * | 5/1977 | Chowing et al. ............... | 713/2 |
| 5,432,941 A | * | 7/1995 | Crick et al. ...................... | 713/1 |
| 5,499,108 A | | 3/1996 | Cotte et al. .................. | 358/400 |
| 5,594,921 A | | 1/1997 | Pettus .......................... | 710/11 |
| 5,608,903 A | | 3/1997 | Prasad et al. .................. | 707/10 |
| 5,721,900 A | * | 2/1998 | Banning et al. ................ | 707/4 |
| 5,740,469 A | | 4/1998 | Yin et al. ...................... | 710/65 |
| 5,745,765 A | | 4/1998 | Paseman ...................... | 717/107 |
| 5,758,344 A | | 5/1998 | Prasad et al. .................. | 707/10 |
| 5,784,463 A | | 7/1998 | Chen et al. ................... | 713/171 |
| 5,802,519 A | | 9/1998 | De Jong ...................... | 707/100 |
| 5,884,323 A | | 3/1999 | Hawkins et al. ............ | 707/201 |
| 5,895,471 A | * | 4/1999 | King et al. .................. | 707/104 |
| 6,128,012 A | * | 10/2000 | Seidensticker, Jr. et al. ..... | 345/336 |
| 6,226,665 B1 | * | 5/2001 | Deo et al. .................... | 709/106 |

FOREIGN PATENT DOCUMENTS

GB 2326010 6/1997

OTHER PUBLICATIONS

John, L. Viescas, Running Microsoft Access 97, Select Edition, pp. 3–155.*

Demke, K.R., "Keyboard for Portable Personal Computer", *IBM Technical Disclosure Bulletin*, vol. 29, No. 11, Apr. 1987.

Miller, M., et al. "Mobile applications: working and learning in global networks", *ITT+TI Informationstechnik und Technische Informatik*, vol. 40, No. 6, pp. 35–49, Dec. 1998.

Buckle, D.F., "The SIMTEC simulation framework", *GEC Review*, vol. 14, No. 1, pp. 28–36, 1999.

* cited by examiner

Primary Examiner—John Breene
Assistant Examiner—Mohammad Ali
(74) Attorney, Agent, or Firm—Gates & Cooper LLP

(57) ABSTRACT

The present invention discloses a method, apparatus, and article of manufacture for generating a database application. In accordance with the present invention, a features list is built for the database application. The features list contains user-selected functions. The database application is dynamically configured based on the built features list.

18 Claims, 3 Drawing Sheets

GENERATING SMALL FOOTPRINT APPLICATIONS FOR MOBILE DEVICES

BACKGROUND OF THE INVENTION

1. Field of the Invention

This invention relates in general to a computer implemented database system, and more particularly, to generating small footprint applications for mobile devices.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

A variety of mobile devices such as Palm, Windows CE handheld devices, various embedded systems, and smart card, may utilize a RDBMS for storing and retrieving data. These types of mobile devices have become very popular and are increasingly being used by a wide spectrum of people. Unfortunately, these small devices have limited memory, a small display, and operate at slow speeds.

Due to the limited memory of mobile devices, some users download small footprint database applications. The term footprint generally refers to the amount of disk space required by an application. Many of the footprint applications are still too large for the mobile devices' limited memory. To solve the memory space dilemma, a user can modify the traditional footprint applications and create a customized footprint application that is designed for a particular mobile device. This customized footprint application tends to contain fewer functions than the traditional footprint applications, and hence, has a smaller memory requirement than the traditional footprint applications.

Customizing a footprint application may involve providing a list of desired functions to a software developer who then develops a footprint application that contains the desired functions. The list of desired functions is typically based on both the memory constraints of a particular mobile device and on a user's needs for a specific functionality. Mobile devices designed by different manufactures could have different memory constraints, and each individual user of these mobile devices could desire different functions. To comply with each device's memory constraints and to satisfy each user's functional needs, software developers may need to spend time developing several different versions of a footprint application.

Thus, there is a definite need in the art for an improved technique of customizing footprint applications that eliminates the task of developing multiple versions of footprint applications.

SUMMARY OF THE INVENTION

To overcome the limitations in the prior art described above, and to overcome other limitations that will become apparent upon reading and understanding the present specification, the present invention discloses a method, apparatus, and article of manufacture for generating a database application.

In accordance with the present invention, a features list is built for the database application. The feature list contains user-selected functions. The database application is dynamically configured based on the built features list.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
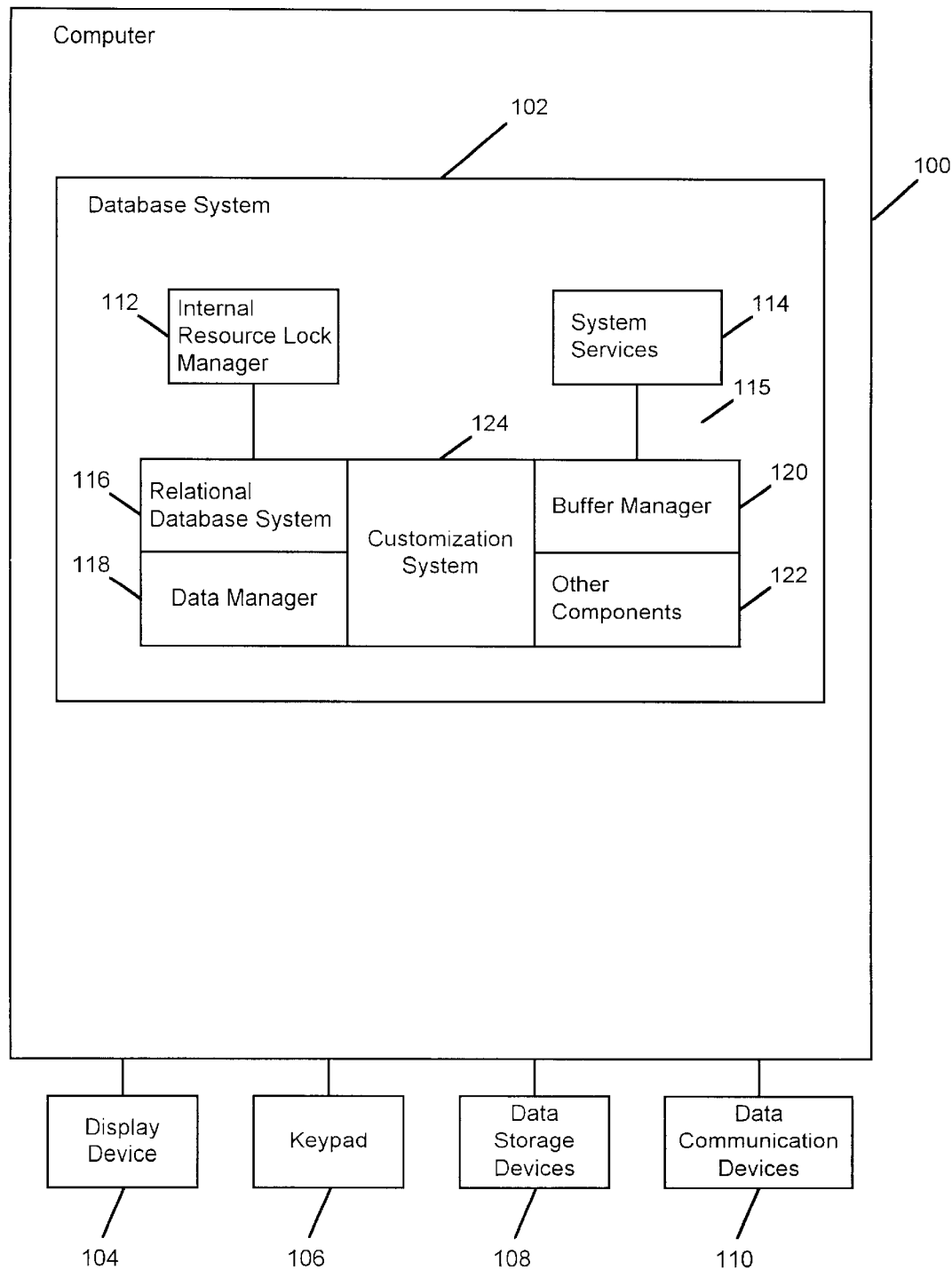
FIG. 1 is a computer hardware environment used to implement a preferred embodiment of the invention.

FIG. 1 illustrates a computer hardware environment that could be used in accordance with the present invention. In the computer environment, a computer system 100 represents a small device, such as a PalmOS or Windows CE handheld device. The computer 100 is comprised of one or more processors (not shown), a display device 104, a keypad 106, data storage devices 108, and data communication devices 110. The data storage devices 108 that store data for one or more relational databases may be a fixed or hard disk drive, a floppy disk drive, a CDROM drive, or other device. Additionally, the computer 100 contains a database system 102. Operators of the computer system 100 submit commands for performing various search and retrieval functions, termed queries, against databases via the database system 102. In the present invention, these queries conform to the Structured Query Language (SQL) standard, and invoke functions performed by Relational DataBase Management System (RDBMS) software.

In the preferred embodiment of the present invention, the RDBMS software comprises DB2® Everywhere (i.e., a product from International Business Machines Corporation) for Windows CE and PalmOS. DB2® Everywhere enables users to access enterprise data from a variety of handheld devices. DB2® Everywhere is footprint database software that is designed for mobile workers who need portable handheld deices for database applications. Those skilled in the art will recognize, however, that the present invention has application program to any database software, whether or not the software uses SQL.

As illustrated in FIG. 1, the DB2® Everywhere system includes three major components: the Internal Resource Lock Manager (IRLM) 112, the Systems Services module 114, and the Database Services module 115. The IRLM 110 handles locking services for the DB2® Everywhere system, which treats data as a shared resource, thereby allowing any number of users to access the same data simultaneously. Thus, concurrency control is required to isolate users and to maintain data integrity. The Systems Services module 112 controls the overall DB2® Everywhere execution environment, including managing log data sets, gathering statistics, handling startup and shutdown, and providing management support.

At the center of the DB2® Everywhere system is the Database Services module 115. The Database Services module 115 contains several submodules, including the Relational Database System (RDS) 116, the Data Manager 118, the Buffer Manager 120, the Customization System 124, and other components 122 such as an SQL compiler/interpreter. These submodules support the functions of the SQL language, i.e. definition, access control, interpretation, compilation, database retrieval, and update of user and system data.

The Customization System 124 works in conjunction with an operating system (not shown) to control the size and functionality of the DB2® Everywhere system. Under control of the operating system, the RDBMS software, the SQL statements, and the instructions derived therefrom, may be loaded from the data storage devices 108 into a memory of the computer system 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Customizing a Database Footprint Application

The customization system 124 allows a user to customize a database footprint application after the database footprint application has been developed. In fact, the footprint database application can be customized at runtime. When requesting a download of a customized footprint database application, the user provides the customization system 124 with a list of desired features (or functions). Such features may include, but are not limited to, transaction features, decimal features, and index features. Additionally, during the download of the customized footprint database application, the user may modify the list of desired features, by either deleting features from the list or adding features to the list. Users may delete a feature because of a mobile device's memory constraints and/or because a particular function is not needed. Users may add features because they have adequate space and/or because they need additional functionality.

Before downloading a customized database footprint application to a user (i.e., loading a footprint application onto the mobile device), the customization system 124 partitions the traditional footprint database application into pre-compiled functions (also referred to as modules) that are stored in a library, such as a dynamic link library (DLL) for the WinCE operating system or shared libraries for the Palm operating system. When the customization system 124 starts up, the customization system 124 requires that users select one or more of the pre-compiled functions from the library. Users select these pre-compiled functions via the display 104 and the keypad 106. The customization system 124 stores the user-selected functions in a features list. Then, based on the user's selection, the customization system 124 dynamically configures the footprint database application.

The user's selections are represented in the features list as global pointers to functions. Pointer-to-function values are used in both the C and C++ programming languages to invoke functions. Pointer-to-function values are different from the conventional calling techniques used by some programming languages. Many conventional calling techniques involve simply invoking a function by using the function's name. For example, when invoking a PRINT function, the typical instruction statement is CALL PRINT. Before the PRINT function is invoked, the PRINT source code is compiled and linked into compiled code, such as assembly language. When the PRINT function is called, the conventional calling techniques jump to the address of the PRINT code in the compiled code (e.g., assembly language). These conventional calling techniques are static. That is, the conventional calling techniques require that a plan for invoking functions be defined and implemented during a program development phase, and not after the program has been developed.

By contrast, pointer-to function values are dynamic. Namely, the plan for invoking functions can be defined after the program has been developed —when the program is downloaded to a user.

Pointer-to-function values contain an address of a function (e.g., an entry point in assembly code). The customization system 124 sets each pointer-to-function value after checking the features list. In particular, before loading a function, the customization system 124 checks the features list. The features list contains functions that a user previously selected from the library. For each function that appears on the features list, the customization system 124 sets the pointer-to-function value to the correct address of the function. For the remaining functions that are absent from the features list, but present in the library, the customization system 124 sets the pointer-to-function value to null. Next, the customization system 124 begins the process of loading functions that were on the features list. Before loading a function, the customization system checks the pointer-to-function value. This check before loading is performed because the pointer-to-function value can change at any time.

To illustrate the changing nature of the pointer-to-function value, suppose that during runtime, the customization system 124 checks the pointer-to-function values of function 1 and function 2 and suppose that both values contain function addresses. Suppose further that the customization system 124 first loads function 1. Before loading function 2, the customization system 124 re-checks the pointer-to-function value of function 2 and it is now null. Function 2 may be null because the user removed function 2 from the features list. Accordingly, the customization system 124 will not load function 2.

Figure 2:
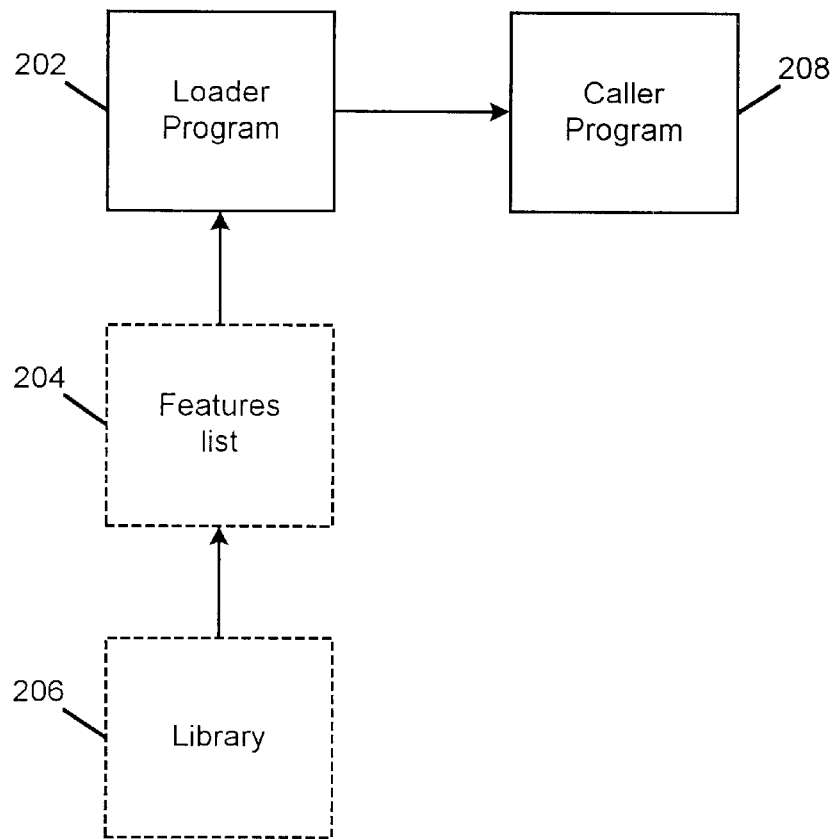
FIG. 2 is a block diagram that illustrates the relationship between a library, a features list, a loader program, and a caller program.

FIG. 2 shows the elements of the customization system 124. In particular, FIG. 2 shows the relationship between a loader program 202, a features list 204, a library 206, and a caller program 208. In particular, the customization system 124 uses the loader program 202 to check the features list 204 and determine whether to load the pre-compiled functions. After the loader program 202 makes its determination about the pre-compiled functions, the caller program 208 calls the functions. The loader program 202 and caller program 208 are permanent elements of the footprint database application, and both the loader program 202 and the caller program 208 are downloaded to the mobile device. In an alternative embodiment of the present invention, users have the option of not storing the features list and the library on the mobile device. When users decide not to store the features list or the library on the mobile device, the customization system 124 does not download the features list or the library. Generally, when the customization system 124 starts up, the customization system 124 partitions the footprint database application into modules and stores the modules in the library 206. During runtime, the customization system 124 calls the loader program to determine which, if any, user-selected functions will be invoked. Next, the customization system 124 calls the caller program 208 and the caller program 208 invokes the user-selected functions.

Figure 3:
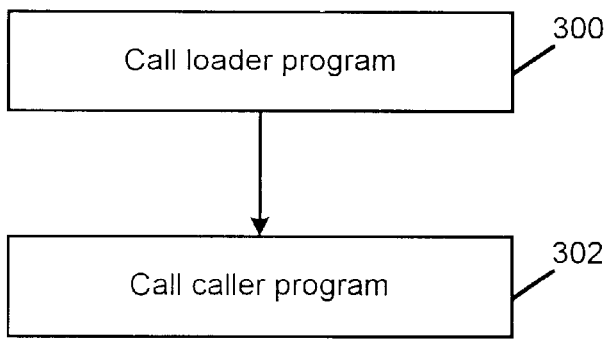
FIG. 3 is a flow diagram that illustrates steps performed by the customization system to dynamically configure the database application in accordance with the present invention.
Figure 4:
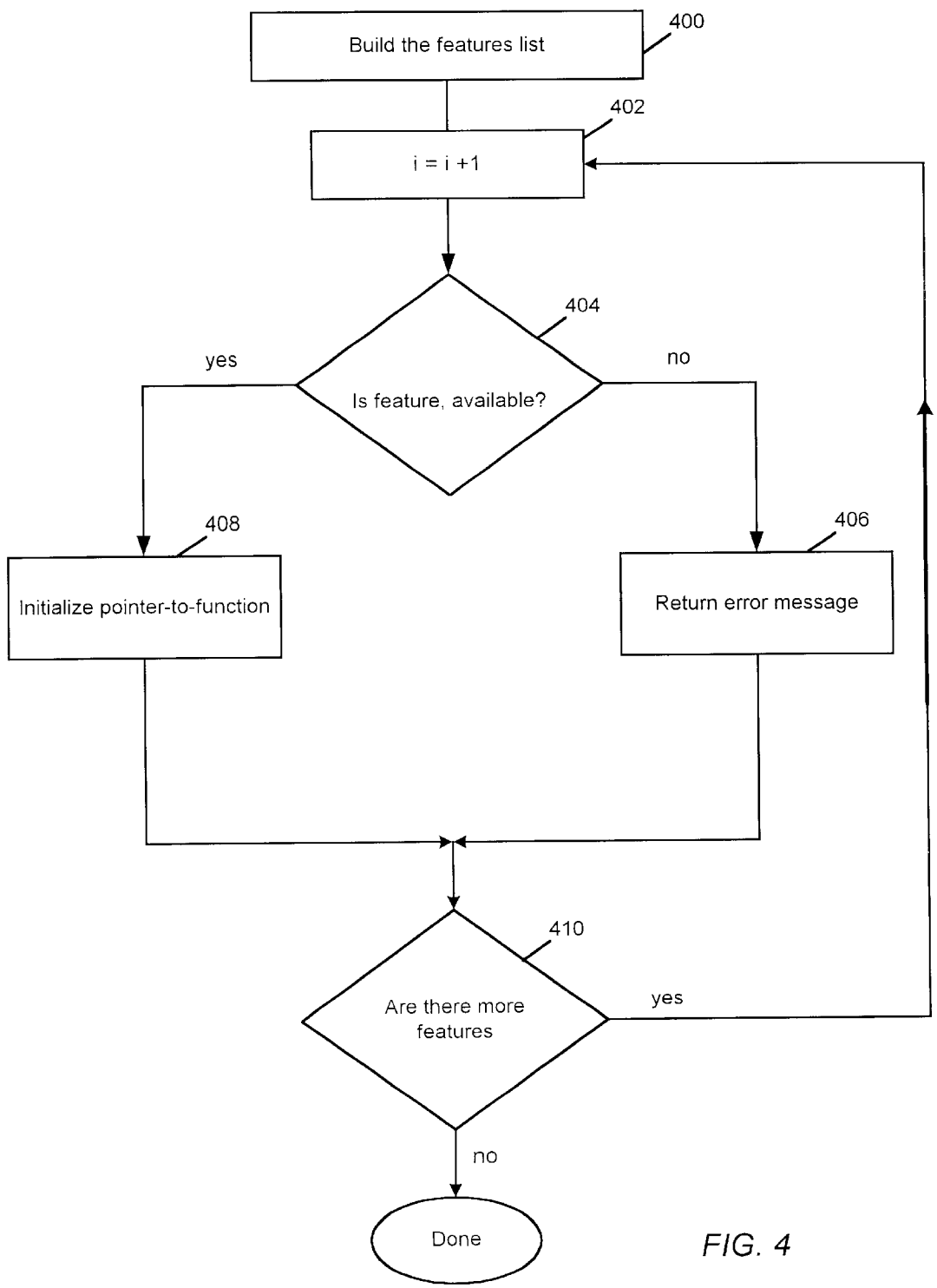
FIG. 4 is a flow diagram that illustrates steps performed by the loader program in accordance with the present invention.

FIG. 3 is a flow chart that illustrates the steps performed in accordance with the present invention. Block 300 represents the customization system 124 dynamically configuring the footprint database application by calling the loader program 202. A flowchart illustrating the steps performed by the loader program 202 is shown in FIG. 4. The customization system 124 then invokes the caller program 208 to call only the user-selected, pre-compiled modules, as represented by block 302.

FIG. 4 is a flow diagram that illustrates the steps performed by the loader program 202 in accordance with the present invention. Block 400 represents the loader program 202 building the features list 204. The features list 204 contains the pointer-to-function values and hence contains a representation of user-selected functions.

Block 402 represents the loader program 202 setting the counter variable "i." The counter variable "i " tracks the number of the features. Block 404 is decision block that represents the loader program 202 determining whether the feature (or function) is available. A feature is available when its pointer-to-function value is not null. A feature is unavailable if its pointer-to-function value is null. If the feature is available, the loader program 202 proceeds to block 408. Otherwise, if the feature is unavailable, the loader program will return an error message as represented by block 406 and continue processing.

The following C programming language notations are used to determine whether a feature is available:

if (pF1)
  (*pF1)( ).

In part, these notations check whether a pointer-to-function value is null.

A single macro function call can also be written in the C programming language (e.g., CALL0(pF1), CALL1(PF2), etc.). Alternatively, a block of code could be used for better performance during runtime of the customization system 124. Exemplary block code in the C programming language is shown below. Indeed, those skilled in the art will recognize that other programming languages can be used without exceeding the scope of the present invention.

```
if (pF1)
{
    (*pF1)();
    While(...)
        if (pF2)
        {
            (*pF2)()
            ...
        }
}
```

Block 408 represents the loader program 202 initializing a pointer-to-function value to the correct function address (i.e., a entry point in assembly code). Block 410 is a decision block that represents the loader program 202 determining whether there are more features. If there are more features, the loader program 202 returns to block 402. Otherwise, the loader program exits and returns to other processing.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. A method of generating a customized application in a computer, said method comprising:

building a features list for the application in the computer, wherein the features list contains one or more user-selected features for downloading from the computer into an other device;

dynamically configuring the application in the computer based on the built features list, wherein the step of dynamically configuring the application further comprises:

determining, for each feature, whether the feature is available; and initializing a reference to the feature based on the determination; and downloading the dynamically configured application from the computer to the other device.

2. The method of claim 1, wherein the step of dynamically configuring further comprises dynamically configuring the application at runtime.

3. The method of claim 1, wherein the application is a footprint database application.

4. The method of claim 1, wherein the step of initializing further comprises initializing the reference to a memory address when the feature is available.

5. The method of claim 1, wherein the step of initializing further comprises initializing the reference to null when the feature is unavailable.

6. The method of claim 1, wherein the step of building further comprises:

receiving one or more features from a user; and building the features list that contains the received feature.

7. An apparatus for generating a customized application, comprising:

a computer; and means, performed by the computer, for building a features list for the application in the computer, wherein the features list contains one or more user-selected features for downloading from the computer into an other device;

means, performed by the computer, for dynamically configuring the database application in the computer based on the built features list, wherein the means for dynamically configuring further comprises:

means for determining, for each feature, whether the feature is available; and means for initializing a reference to the feature based on the determination; and means, performed by the computer, for downloading the dynamically configured application from the computer to the other device.

8. The apparatus of claim 7, wherein the means for dynamically configuring further comprises dynamically configuring the application at runtime.

9. The apparatus of claim 7, wherein the application is a footprint database application.

10. The apparatus of claim 7, wherein the means for initializing further comprises means, performed by the computer, for initializing the reference to a memory address when the feature is available.

11. The apparatus of claim 7, wherein the means for initializing further comprises means, performed by the computer, for initializing the reference to null when the feature is unavailable.

12. The apparatus of claim 7, wherein the means for dynamically configuring further comprises means, performed by the computer, for receiving one or more features from a user, and for building the features list that contains the received features.

13. An article of manufacture comprising a computer program carrier readable by a computer and embodying one or more instructions executable by the computer to perform the method steps of generating a customized application, said method comprising:

building a features list for the application in the computer, wherein the features list contains one or more user-selected features for downloading from the computer into an other device;

dynamically configuring the application in the computer based on the built features list, wherein the step of dynamically configuring the application further comprises:

determining, for each feature, whether the feature is available; and initializing a reference to the feature based on the determination; and downloading the dynamically configured application form the computer to the other device.

14. The article of manufacture of claim 13, wherein the step of dynamically configuring further comprises dynamically configuring the application at runtime.

15. The article of manufacture of claim 13, wherein the application is a footprint database application.

16. The article of manufacture of claim 13, wherein the step of initializing further comprises initializing the reference to a memory address when the feature is available.

17. The article of manufacture of claim 13, wherein the step of initializing further comprises initializing the reference to null when the feature is unavailable.

18. The article of manufacture of claim 13, wherein the step of building further comprises:

receiving one or more features from a user; and building the features list that contains the received features.

* * * * *

UNITED STATES PATENT AND TRADEMARK OFFICE
CERTIFICATE OF CORRECTION

PATENT NO. : 6,654,762 B2  
DATED : November 25, 2003  
INVENTOR(S) : Josephine Miu Cheng et al.

It is certified that error appears in the above-identified patent and that said Letters Patent is hereby corrected as shown below:

Column 8,
Line 20, "form" should read -- from --.

Signed and Sealed this

Twenty-fourth Day of February, 2004

JON W. DUDAS
*Acting Director of the United States Patent and Trademark Office*